United States Patent
Uffelman et al.

[15] 3,679,830
[45] July 25, 1972

[54] COHESIVE ZONE BOUNDARY DETECTOR

[72] Inventors: Malcolm R. Uffelman, 1808 Horseback Trail, Vienna; Richard E. Williams, 2605 Tack Lane, Reston; Norbert Kleiner, 3030 Cedar Hill Road, Falls Church, all of Va.

[22] Filed: May 11, 1970

[21] Appl. No.: 36,221

Related U.S. Application Data

[63] Continuation-in-part of Ser. No. 634,332, April 27, 1967.

[52] U.S. Cl. ..........................................................179/1 SA
[51] Int. Cl. ...........................................................G10l 1/02
[58] Field of Search............................179/15 A, 1 US, 1 SB; 324/77 B, 77 E

[56] References Cited

UNITED STATES PATENTS 3,234,332  2/1966  Belar.......................................179/1 SA
3,225,141  12/1965  Dersch...................................179/1 SA
3,368,039  2/1968  Clapper..................................179/1 SA

OTHER PUBLICATIONS

R. Bakis, Interpretation of Speech Sound Sequences, IBM Technical Disclosure Bulletin, 9/1961

*Primary Examiner*—William C. Cooper
*Assistant Examiner*—Jon Bradford Leaheey
*Attorney*—Schulze, Blair & Benoit

[57] ABSTRACT

A speech segmenting device having a set of detectors which are activated by various combinations of energy distribution relative to a frequency scale such that continuous speech can be divided into repeatable patterns for use in a speech recognition process. These patterns called cohesive zones are naturally occuring segments or components of speech which are repeatable from speaker to speaker.

4 Claims, 12 Drawing Figures

|  | VOWEL | SEMIVOWEL | LATERAL | NASAL | PLOSIVE | VOICED FRICATIVE | UNVOICED FRICATIVE | SILENCE |
|---|---|---|---|---|---|---|---|---|
| VOWEL | 1 | 0 | 0 | 0 | 0 | 0 | 0 | 0 |
| SEMIVOWEL | 0 | 1 | 0 | 0 | 0 | 0 | 0 | 0 |
| LATERAL | 0 | 0 | 1 | 0 | 0 | 0 | 0 | 0 |
| NASAL | 0 | 0 | 0 | 1 | 0 | 0 | 0 | 0 |
| PLOSIVE | 0 | 0 | 0 | 0 | 0 | 0 | 0 | 0 |
| VOICED FRICATIVE | 0 | 0 | 0 | 0 | 0 | 1 | 0 | 0 |
| UNVOICED FRICATIVE | 0 | 0 | 0 | 0 | 0 | 0 | 1 | 0 |
| SILENCE | 0 | 0 | 0 | 0 | 0 | 0 | 0 | 1 |

*FIG. 1.*

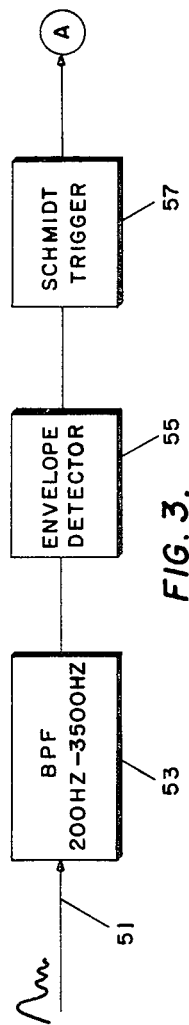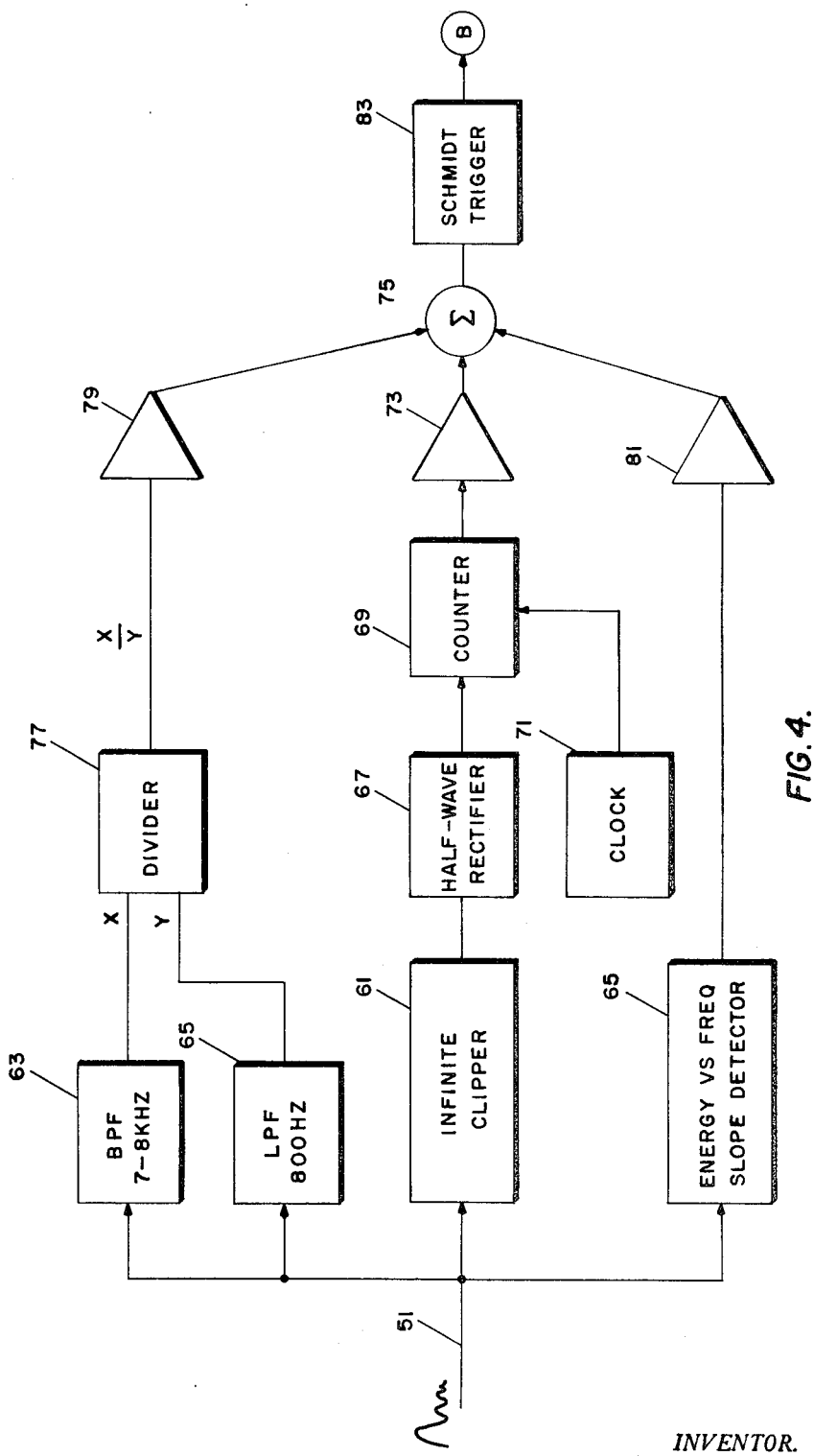

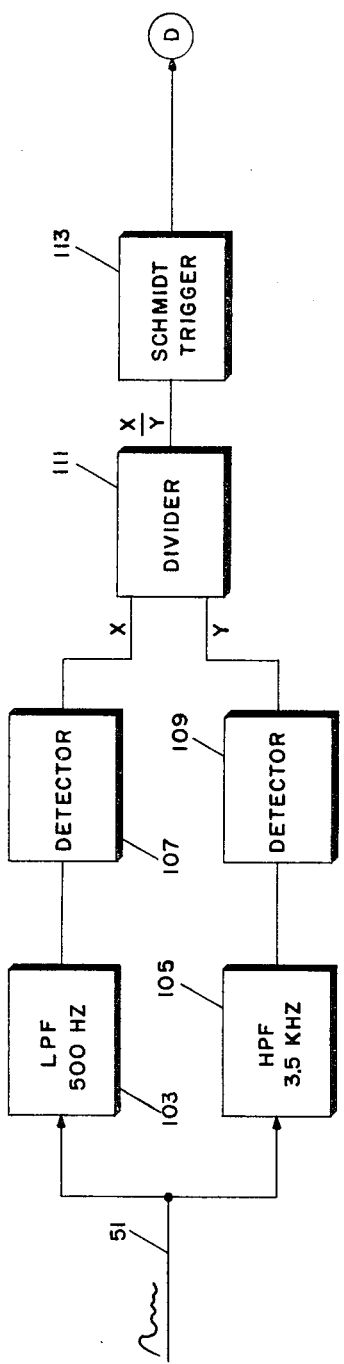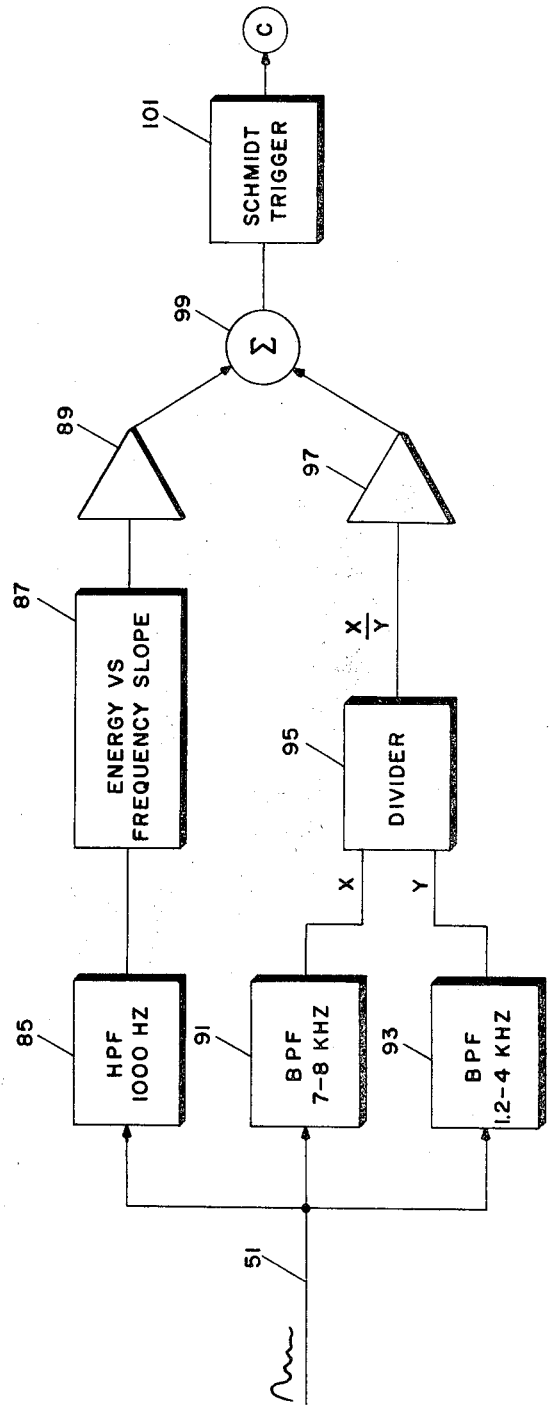

COHESIVE ZONE BOUNDARY DETECTOR

This application is a Continuation of U.S. Pat. application Ser. No. 634,332 filed Apr. 27, 1967.

Generally speaking, this invention relates to a system for detecting and locating the boundaries of repeatable and identifiable segments of continuous speech, as represented by a spectogram, which are useful for speech recognition processes. The segments of speech thus bounded are referred to as cohesive zones.

Although it is possible to characterize speech completely by describing its amplitude as a function of time, it is believed that a more convenient means of characterization is achieved by expressing the "instantaneous" power, that is, short-term power, of speech as a function of time and frequency. Accordingly, the present invention is based upon this thesis.

It has long been desired to find a means to convert human speech into a meaningful form which can be used to control machines such as computers, typewriters, etc., or which can serve as a basis for low bandwidth transmissions systems. Many schemes have been proposed for recognition of speech via recognition of phonemes, the fundamental units as defined by linguists. Most of these schemes assume that all of the phonemes can be isolated in connected discourse. This is not true, since individual or static phonemes do not exist as such in that they are linguistic artifacts used for convenience to reduce speech to written material. Phonemes are not acoustical elements and thus, should not be relied upon in the acoustical problem of speech recognition. Certain phonemes, for example the vowels tend to run together in a continuous stream and usually do not exist individually. Thus, the schemes based on phoneme recognition have generally failed in practice. It is, therefore, the purpose of this invention to provide a means whereby a system can be built which will recognize speech and reduce discourse to meaningful code symbols, such as printed texts.

The basic system of this invention provides a means to reliably and repeatedly segment speech units or patterns and to use these units, no matter how complex, as the inputs to a pattern classifying device. Such a pattern classifying device is disclosed in U. S. Pat. application Ser. No. 217,350. These units which can be repeatedly and reliably found are hereby termed cohesive zones. For the purposes of the present invention the term "cohesive zone" is defined as a temporal portion of a speech pattern as described by a spectogram, which is repeatedly isolatable independent of its contexual relation with the preceding and following speech. Therefore, the cohesive zones form a set of basic patterns which can be used to describe the content of a speech passage and can be automatically isolated in continuous speech patterns.

In order to perform the above outlined automatic recognition of human speech, it is necessary to segment the acoustic signal into units suitable for classification. The present invention performs this task on the basis of acoustically significant segments of continuous speech, specifically the "cohesive zones" defined above. It has been determined that approximately 150 cohesive zones are sufficient for the description of spoken English. The analysis of speech on the basis of cohesive zones represents a significant departure from the mainstream of research over the past decade which has been concentrated on a search for acoustic correlates of linguistic units which are abstractions based on perceptual criteria. There is considerable evidence to indicate that a unique correspondence cannot be established between the acoustic speech signal and the phoneme sequence of the linguist. Therefore, the present system correlates the acoustic speech signal with eight general types of cohesive zones each of which can be uniquely identified on the basis of acoustic criteria.

The invention will be understood from the following description taken together with the drawings wherein:

FIG. 1 is a graphic illustration of the classification of nonboundable adjacencies which relate to phonemes that form the polyphonic zones;

FIG. 3 is a schematic diagram of the silence detector used in the present invention;

FIG. 4 is a schematic diagram of the turbulence detector;

FIG. 5 is a schematic diagram of the fricative detector;

FIG. 6 is a schematic diagram of the voicing detector;

A cohesive zone as defined above may contain only one phoneme, in which case it will be termed a monophonic zone, or it may contain more than one phoneme, in which case it will be called a polyphonic zone.

FIG. 1 shows the relationship of the nonboundable adjacent phonemes that form the polyphonic zones with relation to the above discussed detecting techniques. In FIG. 1, "1" indicates nonseparable adjacencies and "0" indicates separable adjacencies.

Figure 2:
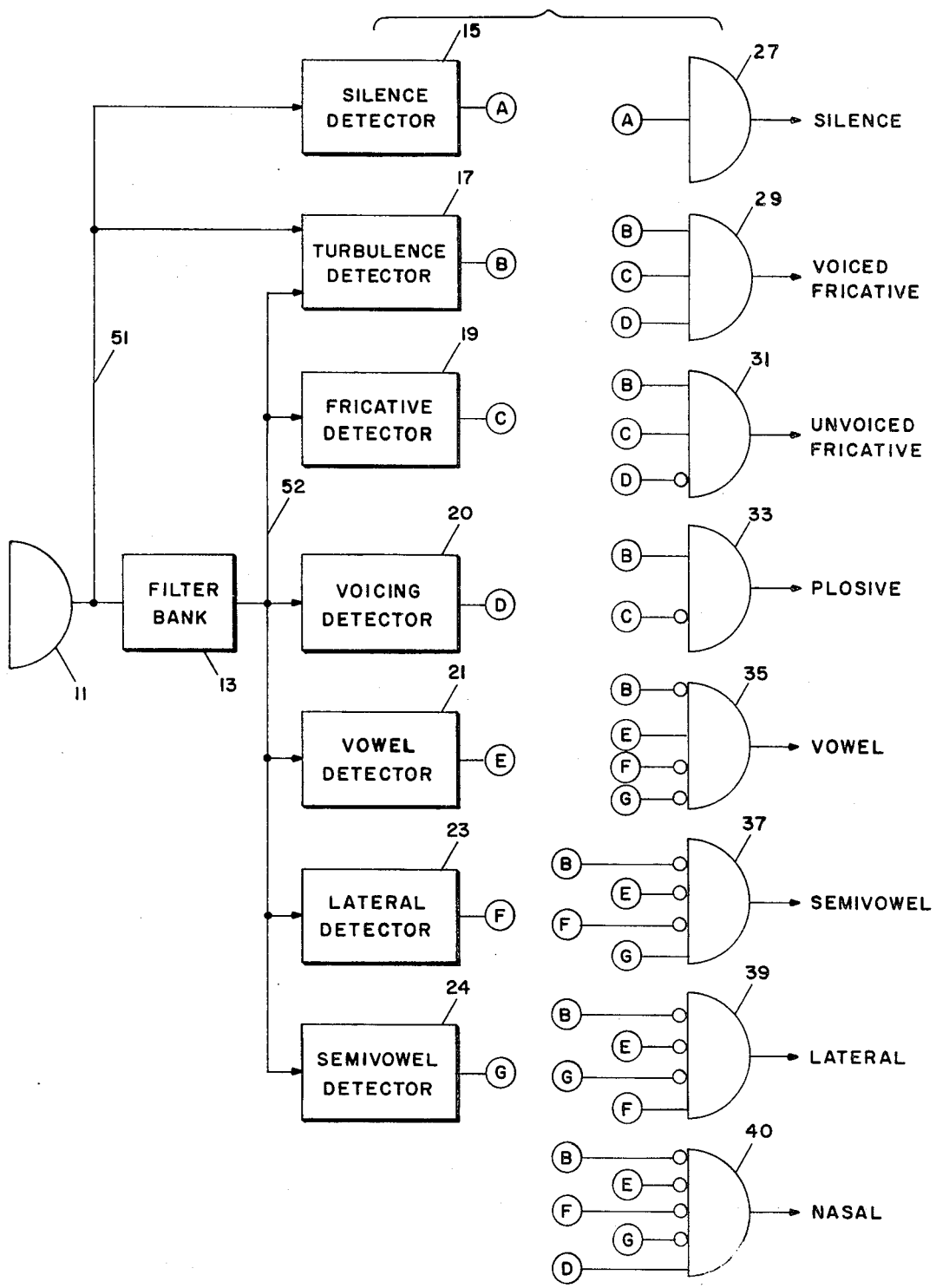
FIG. 2 is a schematic diagram of the basic zone boundary detector of the present invention.

FIG. 2 shows a block diagram of such a zone boundary detector. The input microphone 11 is fed to a filter bank 13 and to the silence detector 15, turbulence detector 17, fricative detector 19, voicing detector 20, vowel detector 21, lateral detector 23 and semi-vowel detector 24 as schematically indicated. Lines 51 and 52 indicate the input to the detectors before and after the filter bank 13.

The various outputs are supplied to the "AND" gates as shown. The specific gates are for determining the boundaries of the phonemes including silence 27, voiced fricative 29, unvoiced fricative 31, plosive 33, vowel 35, semi-vowel 37, lateral 39 and nasal 40. Capital letters A–G are indicated as the various inputs to the gate with the circled input being the inhibit input and the straight input being the allow input into the gate. As will be obvious from FIG. 2, the gate passes certain cohesive zones in accordance with the output combinations of the various detectors.

In addition to performing segmentation of the continuous speech stream, this system also accomplishes a preliminary classification of the zone into one of the following types: silence, voiced fricative, unvoiced fricative, plosive, vowel, semi-vowel, lateral or nasal. Each of these "zone types" corresponds to a unique manner of speech production which is reflected in the acoustic signal. Knowledge of the zone type allows one to select optimum signal parameters for complete zone classification. For instance, if a nasal zone type is indicated the recognition device need only decide if one of the three English nasal sounds ($m$), ($n$) or ($ŋ$) has occurred. This decision can be made by examining the frequency spectrum in range 1$khz$ to 3$khz$.

Figure 12:
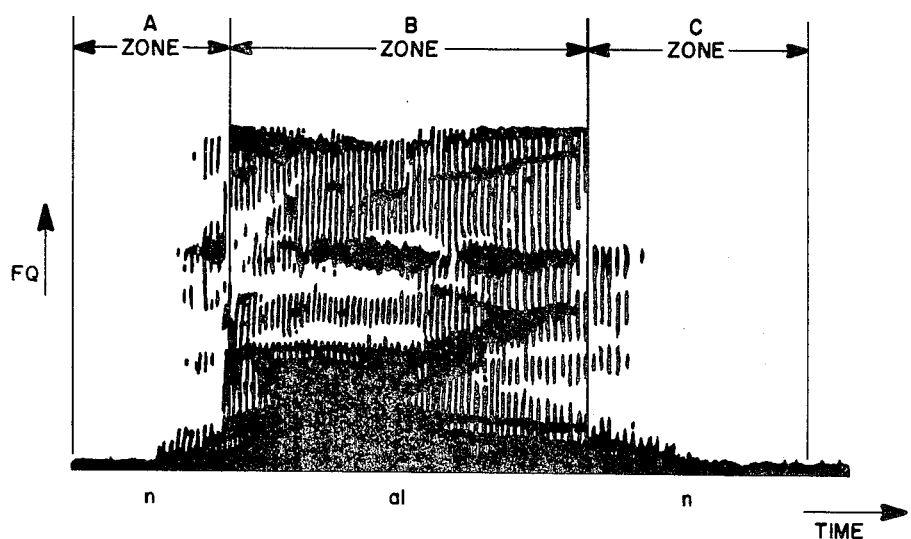
FIG. 12 is a spectrograph of a time plot for a particular spoken word.

As an example of the physical representation of two unique cohesive zones consider the spectrograph shown in FIG. 12. This spectrograph represents the frequency time plot of a speaker saying the word "NINE". This utterance contains four zone boundaries marking three separate zones, indicated as "A Zone", "B Zone" and "C Zone". The A zone, marked by a silence to nasal boundary followed by a nasal to vowel boundary is a nasal zone and is monophonic. The B zone is marked by a nasal to vowel boundary followed by a vowel to nasal boundary and is a polyphonic vowel zone. The final cohesive zone, the C zone, is a nasal zone marked by the vowel to nasal boundary followed by a nasal to silence boundary. Thus, the word "NINE" contains three zones, /n/, /ai/ and /n/ and any speaker of general American English would generate the pattern nasal zone, vowel zone, nasal zone when saying "NINE". Further, the complex spectrograph of the polyphonic zone /ai/ has the same general shape for all speakers of general American English.

The following is a description of the various detectors used in the zone boundary detection system.

SILENCE DETECTOR

The silence detector is depicted in FIG. 3. Detection is accomplished by measuring the total speech energy over an appropriate integration period and comparing the measurement with a threshold. If the total speech energy is less than the threshold, silence is indicated. Appropriate selection of the threshold and the integration time of the detector will permit operation under various noise conditions. The analog speech input is supplied to bandpass filter 53 with the output therefrom passing through an envelope detector 55 which operates a Schmidt trigger 57.

TURBULENCE DETECTOR

The turbulence decision is based on a weighted combination of the ratio of energy in the 7–8 Khz region to the energy below 800 hz, the average rate of zero crossings, and the slope of energy-versus-frequency about 5Khz. This approach allows both a collaborated, instantaneous measure and a confirming long-term measure to indicate turbulence. The turbulence detector is depicted in FIG. 4.

Figure 10:
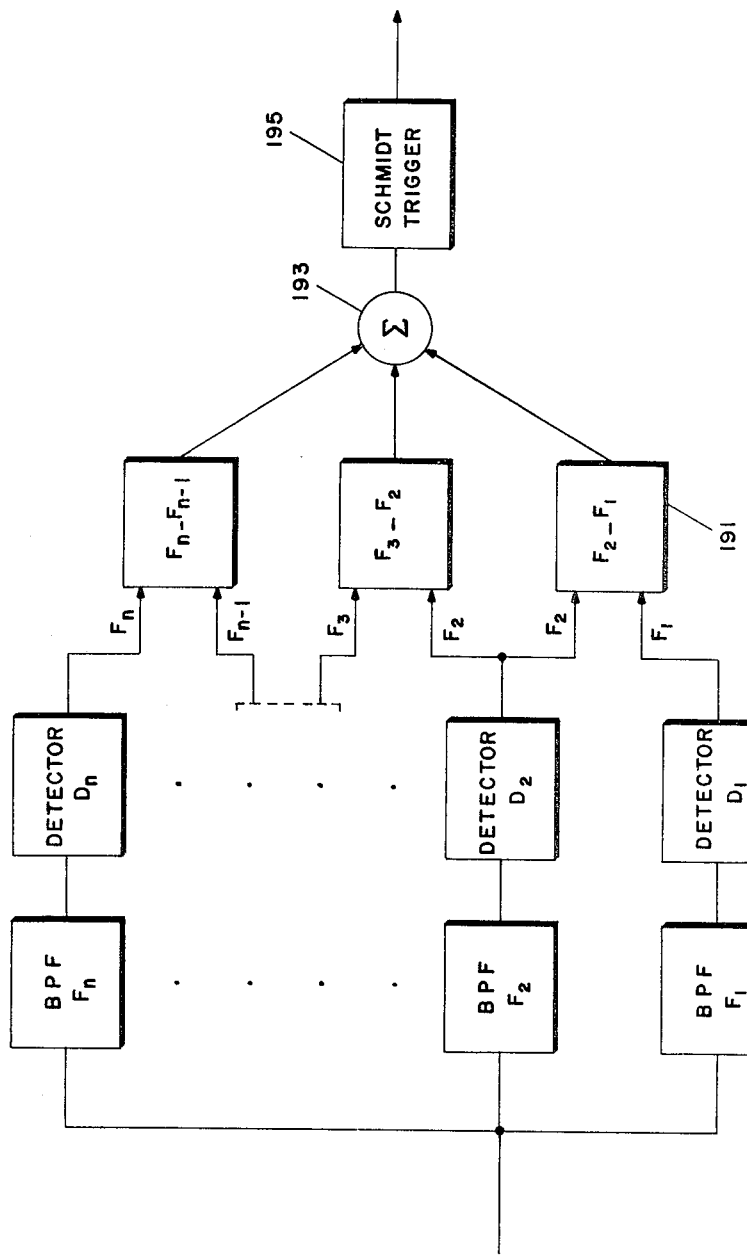
FIG. 10 is a schematic diagram of an energy-versus-frequency slope detector as used in several of the above detectors.
Figure 11:
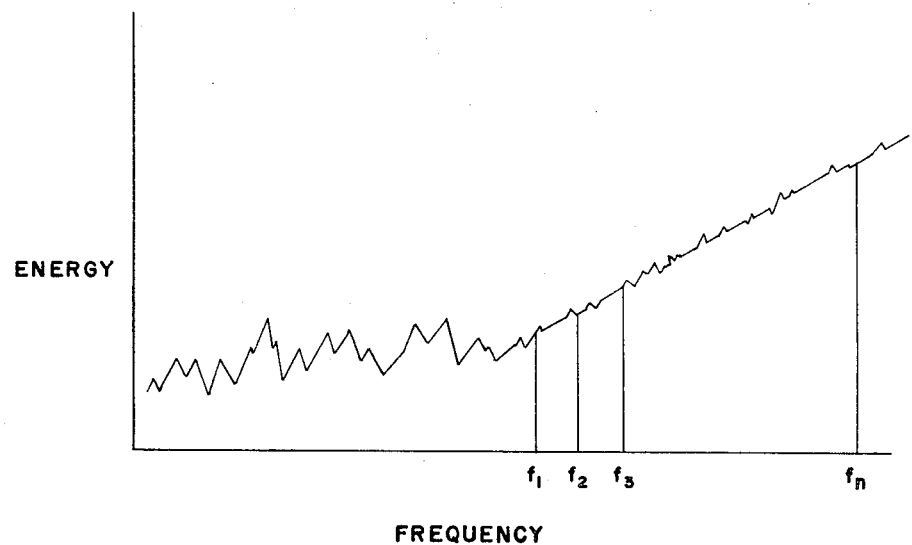
FIG. 11 is a graphic illustration of one particular wave form depicting frequency versus energy.

The analog speech input is supplied directly to infinite clipper 61 through lead 51 and to bandpass filter 63, low pass filter 65 and the energy-versus-slope detector. The latter three components are part of filter bank 13 of FIG. 2 as are all of the filters discussed hereinafter. Additionally, a schematic of the energy-versus-frequency slope detector is shown in FIG. 10, which will be discussed later.

The output of clipper 61 passes through a half-wave rectifier 67 to a counter 69 which is reset by clock 71. The output of the counter gives the zero crossing rate which, in turn, is supplied to summer 75 by amplifier 73.

The outputs of filters 63 and 65 pass through a frequency divider 77 so as to provide the ratio of energy x y as shown. This ratio is supplied to summer 75 by amplifier 79.

The output of slope detector 65 is supplied to summer 75 by amplifier 81. The output of the summer operates Schmidt trigger 83.

FRICATIVE DETECTOR

The fricative detector is depicted in FIG. 5. The fricatives are characterized by a positive slope of the energy-versus-frequency relationship above 1,000 Hz. This slope measurement, in conjunction with the ratio of energy in the 7–8 khz region to the region 1.2–4 khz will be used to detect the presence of fricatives.

The fricative detector involves the same basic type of system as those discussed above. The analog input is supplied to bandpass filters 91 and 93 and to highpass filter 85. The output of the highpass filter is supplied to the energy-versus-frequency slope detector whose output is in turn supplied to summer 99 by means of amplifier 89.

The outputs of filters 91 and 93 are supplied to divider 95 with the output therefrom being delivered to summer 99 by means of amplifier 97. Again, the output of the summer activates trigger 101.

VOICING DETECTOR

The voicing detector is depicted in FIG. 6. The presence and absence of voicing is determined by the ratio of energy in the frequencies below 500 Hz. to the energy in the frequencies above 3.5 khz. If this ratio exceeds a threshold voicing is indicated, if not the sound is considered to be unvoiced.

As schematically shown, the outputs of filters 103 and 105 are coupled to detectors 107 and 109. The outputs of the detectors are coupled to the divider 111 which activates trigger 113.

VOWEL DETECTOR

Figure 7:
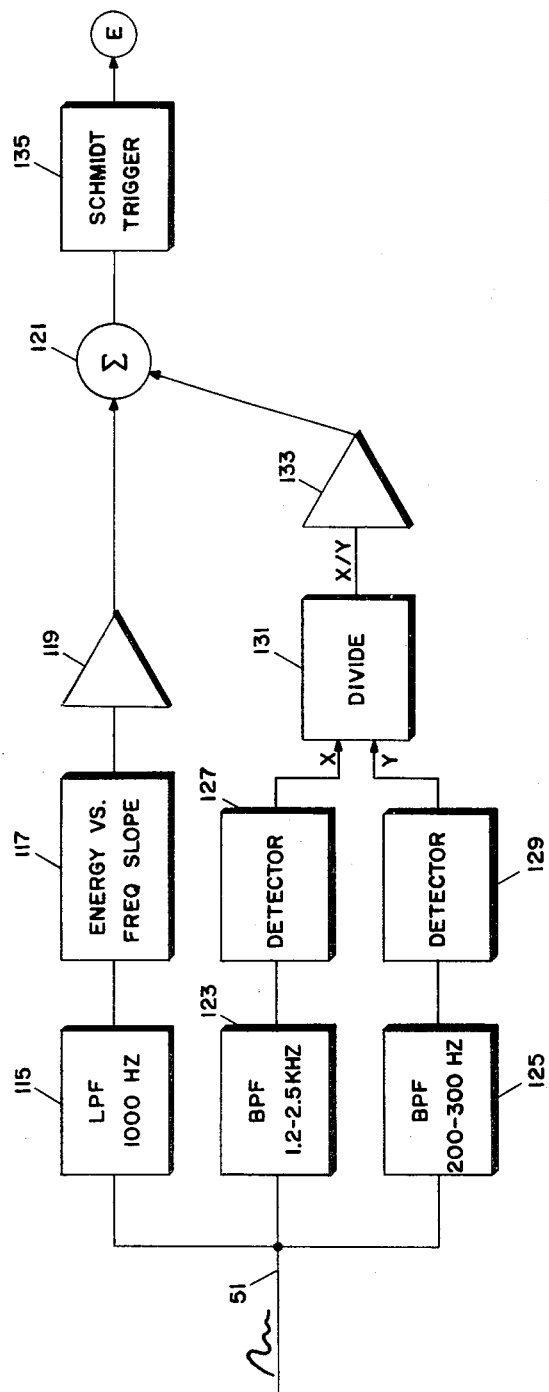
FIG. 7 is a schematic diagram of the vowel detector.

The vowel detector is depicted in FIG. 7. The purpose of this unit is to distinguish between voiced consonants and vowels. Vowel detection is based on the existence of a negative energy-versus-frequency slope in the frequency region below 1,000 Hz and a sufficiently high ratio of energy in the frequency range 1.2 to 2.5 khz to energy in the range 200 to 300 Hz.

The vowel detector includes the lowpass filter 115 coupled to the negative energy-versus-frequency slope detector 117 having an output supplied to summer 121 by amplifier 119.

Also, the bandpass filters 123, 125 and detectors 127, 129 provide an input to divider 131 whose output is supplied to summer 121 by amplifier 133. The output of summer 121 activates trigger 135.

LATERAL DETECTOR

Figure 8:
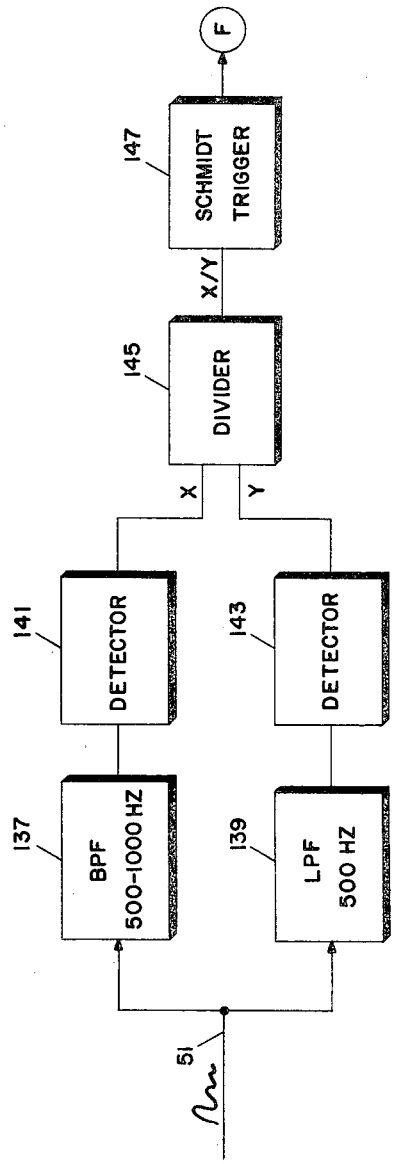
FIG. 8 is a schematic diagram of the lateral detector.

The lateral detector is depicted in FIG. 8. Its purpose is to discriminate between the lateral sounds and the nasals. The primary difference is that in the production of nasal sounds there is total occlusion of the vocal tract with acoustic radiation occurring only through the nostrils while in the laterals there is only a partial occlusion of the vocal tract. This difference in manner of production results in a higher ratio of energy in the region 500–1,000 Hz to energy in the region below 500 Hz for laterals than for nasals.

Accordingly, the ratio of the outputs of filters 137 and 139 as supplied by detectors 141 and 143 is determined by divider 145 which, in turn, activates trigger 147.

SEMI-VOWEL DETECTOR

Figure 9:
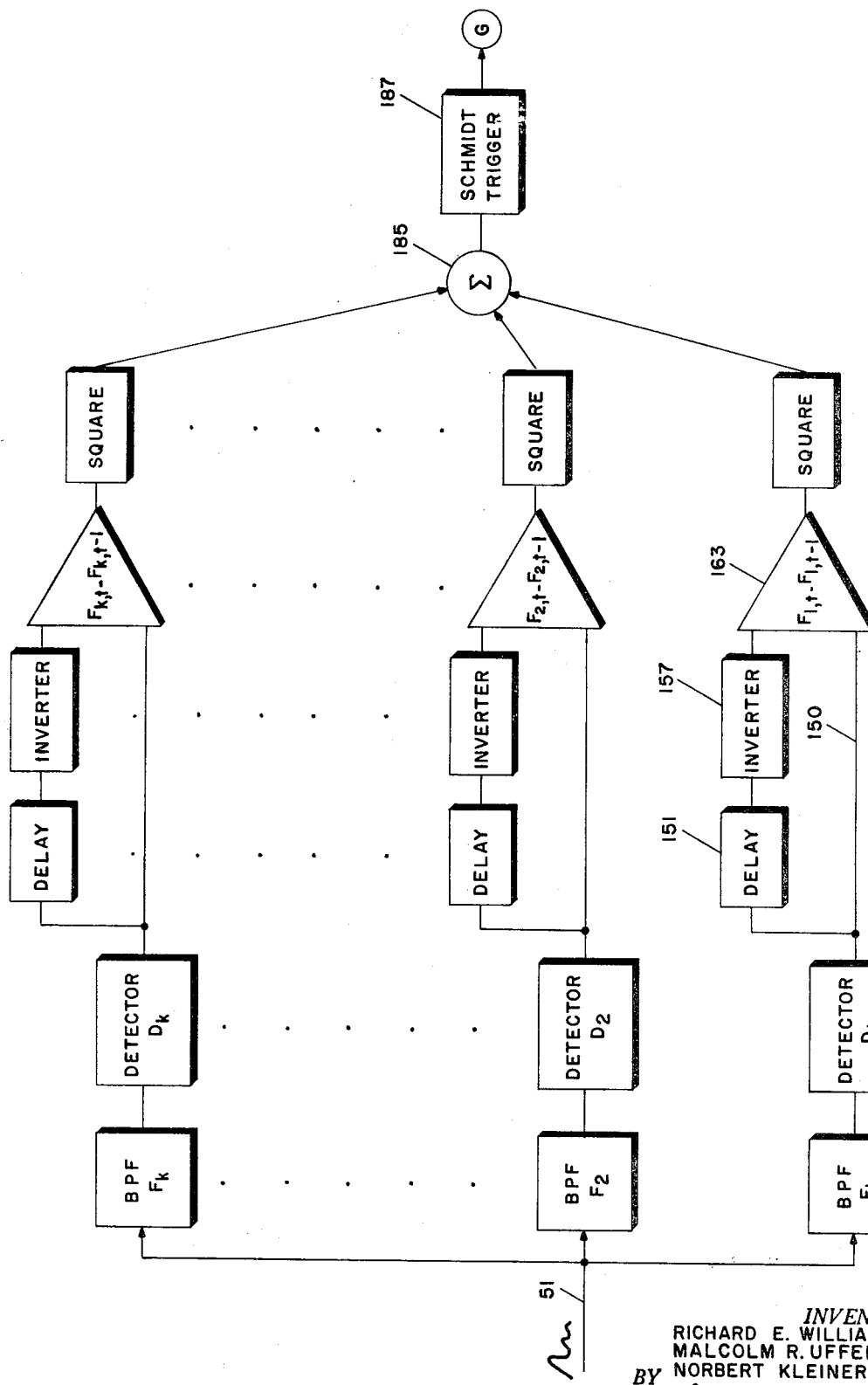
FIG. 9 is a schematic diagram of the semivowel detector.

The semi-vowel detector is depicted in FIG. 9. Its purpose is to discriminate between semi-vowels and nasals. The nasals are characterized by an essentially steady-state power spectrum while the semi-vowels are characterized by a changing power spectrum. The semi-vowel detector measures the absolute change in the power spectrum as a function of time. If this change exceeds a certain threshold a semi-vowel is indicated.

The semi-vowel detector consists of a plurality of bandpass filters and detectors with the necessary circuitry necessary to measure the absolute change in the power spectrum as a function of time. The greater the number of filters, the clearer will be the final output. However, it has been determined that a bank of twenty filters is satisfactory. Since each individual filter system operates in the same manner, only one will be discussed.

The analog speech signal passes through filter $F_1$ and detector $D_1$. The signal from the detector is supplied directly to differential amplifier 163 by means of lead 150. Additionally, the signal passes through a delay line 151 and inverter 157 so as to provide the second input to amplifier 163. The output of amplifier 163 represents the change as a function of time. The outputs of all of the amplifiers are squared and supplied to the summer 185 which activates the trigger 187.

ENERGY-VERSUS-FREQUENCY SLOPE DETECTOR

Turning now to FIG. 10, there is shown an energy-versus-frequency slope detector as shown in FIGS. 4, 5 and 7.

The detector provides a series of bandpass filters which provide incremental steps above a predetermined energy point, such as 5 Khz. For purposes of discussion, filters $F_1$ and $F_2$ will be considered. Each of these filters is coupled to a detector $D_1$ and $D_2$, respectively. The output of the detectors is supplied to a difference amplifier 191. The outputs of the difference amplifiers are summed algebraically by summer 193. Trigger 195 produces an output as long as there is a positive slope.

In the vowel detector of FIG. 7 a negative slope detector is required. This can be accomplished by inserting an inverter between summer 193 and trigger 195.

System operation is as follows. The output to the pattern classifying device is as indicated diagrammatically in FIG. 2. Silence is indicated by a positive output from the silence detector. A voiced fricative is indicated by positive outputs from the turbulence, fricative and voicing detectors. An unvoiced fricative is indicated by positive outputs from the turbulence and fricative detectors and a negative output from the voicing detector. A plosive is indicated by a positive output from the turbulence detector accomplished by a simultaneous negative output from the fricative detector. A vowel is indicated by a positive output from the vowel detector accompanied by negative outputs from the turbulence, lateral and semi-vowel detectors. A semi-vowel is indicated by a positive output from the semi-vowel detector accompanied by negative outputs from the turbulence, vowel and lateral detectors. A lateral is indicated by a positive output from the lateral detector accompanied by negative outputs from the turbulence, vowel and semi-vowel detectors. A nasal is indicated by a positive output from the voicing detector accompanied by negative outputs from the turbulence, vowel, semi-vowel and lateral detectors.

The above description and drawings are to be considered illustrative only since individual components could be substituted in the system. Accordingly, the scope of the invention is to be limited only by the following claims.

We Claim:

1. A system for detecting and locating the boundaries of repeatable and identifiable segments of continuous speech comprising
   a silence detector,
   a turbulence detector,
   a fricative detector,
   a voicing detector,
   a vowel detector,
   a lateral detector,
   a semi-vowel detector,
   means for converting speech into an electrical signal having a amplitude variation in accordance with said speech,
   means for simultaneously supplying said signal to each of said detectors,
   a plurality of AND gates coupled to the output of said detectors in a predetermined manner so as to produce outputs defining the cohesive boundaries of the existence of phonemes in said continuous speech, and
   said outputs including boundaries indicative of silence, voiced fricative, plosive, vowel, semi-vowel, lateral and nasal.

2. The system of claim 1 further comprising a pattern recognition device coupled to the outputs of said detectors.

3. In a system for the recognition of speech including silence, turbulence, fricative, voicing, vowel, lateral and semi-vowel detectors connected to a means for converting speech into electrical signals having an amplitude variation in accordance with said speech, the improvement for locating the boundaries of repeatable and identifiable segments of continuous speech which comprises
   gating means coupled to said silence detector for providing an output indicative of a silence boundary,
   gating means coupled to said turbulence, fricative, and voicing detector for providing an output indicative of a voiced fricative boundary,
   gating means coupled to said turbulence, fricative and voicing detector for providing an output indicative of an unvoiced fricative boundary,
   gating means coupled to said turbulence and fricative detector for providing an output indicative of a plosive boundary,
   gating means coupled to said turbulence, vowel, lateral and semi-vowel detector for providing an output indicative of a vowel boundary,
   gating means coupled to said turbulence, vowel, lateral and semi-vowel detector for providing an output indicative of a semi-vowel boundary,
   gating means coupled to said turbulence, vowel, lateral and semi-vowel detector for providing an output indicative of a lateral boundary, and
   gating means coupled to the turbulence, vowel, lateral semi-vowel and voicing detector for providing a signal indicative of a nasal boundary.

4. The system of claim 3 further comprising a pattern recognition device coupled to the outputs of said gating means.

* * * * *